(12) United States Patent
Dambman et al.

(10) Patent No.: US 11,420,327 B2
(45) Date of Patent: Aug. 23, 2022

(54) AUTOMATED CONTROL OF MULTI-PROCESS USING ROBOTIC EQUIPMENT FOR COMPLEX WORKFLOWS

(71) Applicant: BioSero Inc., San Diego, CA (US)

(72) Inventors: Jonathan David Dambman, San Diego, CA (US); Corey McCoy, Prescott, AZ (US); Andrew St. Yves, Colchester (GB); Prabhakar Henry, San Diego, CA (US); William Berg, Warner Robins, GA (US)

(73) Assignee: BioSero Inc., San Diego, CA (US)

( * ) Notice: Subject to any disclaimer, the term of this patent is extended or adjusted under 35 U.S.C. 154(b) by 356 days.

(21) Appl. No.: 16/674,704

(22) Filed: Nov. 5, 2019

(65) Prior Publication Data

US 2021/0129327 A1 May 6, 2021

(51) Int. Cl.
*G06Q 10/06* (2012.01)
*B25J 9/16* (2006.01)
(52) U.S. Cl.
CPC .......... *B25J 9/1661* (2013.01); *B25J 9/1658* (2013.01); *B25J 9/1669* (2013.01); *G06Q 10/0631* (2013.01)
(58) Field of Classification Search
CPC .......... G06Q 10/0631; G05B 19/41865; G05B 2219/39167
See application file for complete search history.

(56) References Cited

U.S. PATENT DOCUMENTS

| 8,078,487 B2 * | 12/2011 | Li ................. G06Q 10/063116 705/7.22 |
| 2002/0078432 A1 | 6/2002 | Charisius et al. |
| 2002/0147515 A1 * | 10/2002 | Fava ................ G01N 35/0099 700/95 |
| 2005/0234577 A1 * | 10/2005 | Loughran ............. G16Z 99/00 700/100 |
| 2013/0110274 A1 | 5/2013 | D'Mura et al. |
| 2013/0128035 A1 | 5/2013 | Johns et al. |
| 2016/0121487 A1 | 5/2016 | Mohan et al. |
| 2017/0050321 A1 * | 2/2017 | Look ................ G06Q 10/0631 |

(Continued)

OTHER PUBLICATIONS

Luckcuck, et al., Formal Specification and Verification of Autonomous Robotic Systems: A Survey, ACM Computing Surveys 52(5): 100:1-100:41 (2019).

(Continued)

*Primary Examiner* — Nadja N Chong Cruz
(74) *Attorney, Agent, or Firm* — UltimatEdge IP Law Group, P.C.; Dean G. Stathakis

(57) ABSTRACT

An approach for fully automating the use of robotic devices in a laboratory workflow includes defining sequences for automating tasks and equipment involved in such a workflow, and calculating a path for each sequence that resolves get, handoff, and placement procedures. The approach develops a schedule that executes resolved pathways in and between each device. The approach is provided with an easy-to-use interface, in which a user drags and drops devices to automatically configure them, defines operations to be performed by these devices, and then runs the laboratory workflow. The interface also provides the ability to monitor progress of the workflow, and make modifications and adjustments as needed.

33 Claims, 4 Drawing Sheets

(56) References Cited

U.S. PATENT DOCUMENTS

2017/0327247 A1* 11/2017 Dike ................ G05B 19/41865
2018/0085914 A1   3/2018 Kuffner, Jr. et al.
2019/0033819 A1*  1/2019 Chao ....................... G06F 15/76

OTHER PUBLICATIONS

WIPO, PCT Form ISA 210 International Search Report for PCT/US2020/059191, pp. 3 (dated Feb. 5, 2021).
WIPO, PCT Form ISA 237 Written Opinion for PCT/US2020/059191, pp. 8 (dated Feb. 5, 2021).

* cited by examiner

AUTOMATED CONTROL OF MULTI-PROCESS USING ROBOTIC EQUIPMENT FOR COMPLEX WORKFLOWS

FIELD

The present invention relates to the field of robotics and integrating robotic processes. Specifically, the present invention relates to a system and method of integrating multiple processes performed by robotic equipment, and scheduling of the integrated processes, for automated control of workflows involving such robotic equipment, particularly in the performance of laboratory tasks and experiments in the field of life sciences.

BACKGROUND

There are many existing approaches to automating activities, such as laboratory tasks and experiments, that involve robotic equipment. These existing approaches are generally focused on automating performance of a single workcell or a single robot, and are constrained by a difficult setup process, regardless of whether the activity involves the use of one or more robotic devices. These existing approaches are limited in scalability as they do not account for integration of multiple devices and identifying and scheduling multiple paths along which robotic activity must be accomplished for carrying out a sophisticated workflow or process involving different workstations performed by different types of robots. These existing approaches are further constrained by difficulties in pooling of robotic equipment and in allowing for fully interleaved processes, where a set of instruments can be shared by multiple methods running simultaneously.

Existing approaches are restricted by their limited throughput or volume capability, large walk-away times requiring due to extensive human oversight needed, and laborious set up time and limited expansion capabilities as noted above. Where such approaches are utilized in specific life sciences applications, they are further hampered by limitations in tracking of laboratory samples and equipment used, handling of liquids, and simplification of assays with complicated requirements. Additionally, life sciences applications often involved handling of sensitive material, making automation of workflows difficult due to the monitoring and diligence required in maintaining a reliable, accurate process. Further, where workflows have been successfully automated, the transportation paths are fixed to a single path and do not support dynamic just in time calculation and reprioritization of paths.

SUMMARY

It is therefore one objective of the present invention to provide a system and method for integrating workflows involving robotic equipment. It is another objective of the present invention to provide a system and method of scheduling integrated tasks in the performance of such workflows. It is still another objective to provide a system and method for automated control of workstations in the performance of complex processes that is agnostic as to hardware devices such as the type or manufacturer of robotic equipment. It is still a further objective of the present invention to provide a system and method of integrating and scheduling performance of such workflows that includes an interface that enables users to quickly design and modify processes and access analytical data relative to such workflows.

It is still a further objective of the present invention to provide a system and method of integrating and scheduling performance of workflows in life sciences applications involving the performance of laboratory tasks. It is yet another objective of the present invention to enable users to manage complex liquid handling protocols in workflows involving such laboratory tasks and robotic equipment, and still a further objective to automate such workflows for diverse life sciences applications, including compound management, high throughput and content screening, cell and tissue culturing, genomic sequencing, and tracking and compiling immunoassays.

It is a further objective of the present invention to automate the integration and scheduling of robotic workflows for applications outside the field of life sciences. Examples of such non-life sciences applications include, but are not in any way limited to, packaging and shipping of consumer goods, facilitating safe and effective human transportation, and managing the manufacturing of highly complex, multi-part industrial products such as airplanes, automobiles, and commercial ships.

The present invention provides an approach for fully automating both the integration of multiple robotic devices in the performance of a laboratory workflow, and the scheduling of tasks or workcells that together comprise a process in executing such workflows. This approach is performed in one or more systems and methods that allow users to define equipment and operations to be performed in the multiple tasks or workcells that encompass such workflows. The present invention is therefore a tool for automating control of the devices and resolving pathways for executing operations defining such laboratory workflows. The present invention may be used in single or multiple robot configurations, and may involve resolution of workcell tasks in a single path or in multiple paths.

The present invention also provides an easy-to-use interface, in which a user drags and drops devices or robots to automatically configure them, defines operations to be performed by these devices, and then runs the process encompassing these operations. The interface also provides the ability to monitor progress of the process, and make modifications and adjustments as needed during performance.

The present invention is also widely applicable to robotic workflows in activities other than those involving the completion of complex life sciences tasks. For example, the present invention's scheduling and integration aspects may be applied to the performance of any industrial activity involving multiple pieces of robotic equipment or process performed by such equipment, such as packaging consumer goods and preparing and delivering a package for shipment in response to a customized order, or in human transportation systems.

Other objects, embodiments, features and advantages of the present invention will become apparent from the following description of the embodiments, taken together with the accompanying drawings, which illustrate, by way of example, the principles of the invention.

BRIEF DESCRIPTION OF THE DRAWINGS

The accompanying drawings, which are incorporated in and constitute a part of this specification, illustrate several embodiments of the invention and together with the description, serve to explain the principles of the invention.

DETAILED DESCRIPTION

In the following description of the present invention reference is made to the exemplary embodiments illustrating the principles of the present invention and how it is practiced. Other embodiments will be utilized to practice the present invention and structural and functional changes will be made thereto without departing from the scope of the present invention.

Figure 1:
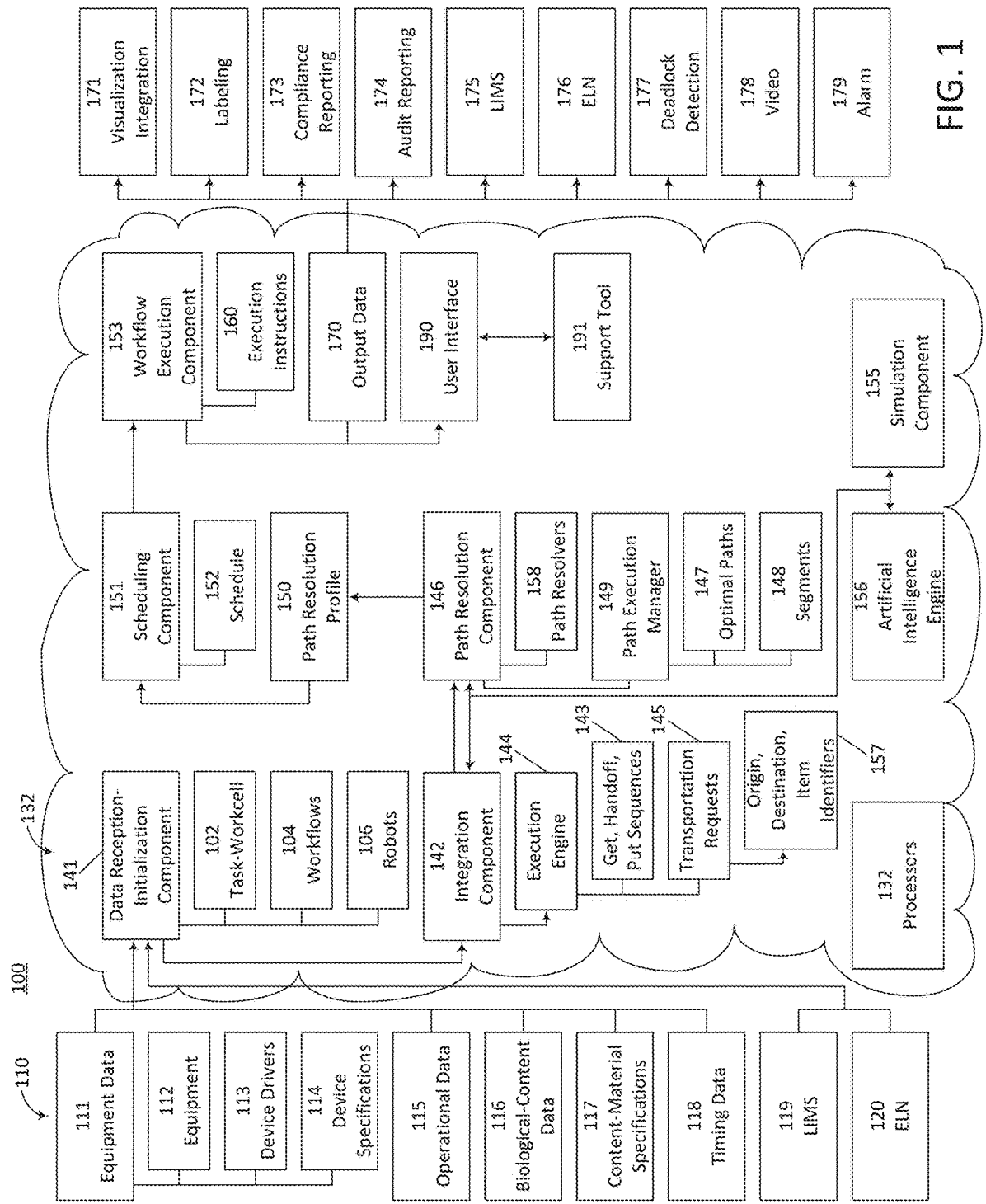
FIG. 1 is a system diagram for a process for integrating multiple tasks or workcells performed by robotic equipment, and for scheduling and automated control of workflows, according to one aspect of the present invention.

FIG. 1 is a system diagram of a process 100 for integrating multiple tasks or workcells 102 performed by robotic equipment 112, and for scheduling and automating control and performance of workflows 104 involving such integrated workcells 102. The process 100 of the present invention is performed within one or more systems and/or methods that includes several components, each of which define distinct activities and functions the different devices and operations involving in performing a complex laboratory workflow 104 involving multiple tasks and experiments.

The process 100 receives, ingests, requests, or otherwise obtains input data 110 that includes multiple types of information relative to integrating, scheduling, and executing workflows 104 performed by robots 106. Input data 110 may include equipment data 111, which defines and identifies pieces of automated equipment 112 for performance of a robotic workflow 102. Equipment data 111 may further include device drivers 113 and device specifications 114, or provide reference markers for the process 100 to obtain such information when the equipment data 111 has been received and the process 100 initiated. The input data 110 may also include operational data 115, defining one or more specific tasks, workcells, or workstations 102 required in the performance of a workflow 104. Operational data 115 may further include an identification of one or more parameters relative to the pieces of equipment 112 used for each of the one or more tasks 102, and/or at that to be used at each stage of a workflow 104, and may also include identification of placement nests, stations, and transport modes or vehicles (including humans) used in performing the one or more tasks 102, identification of labware or other items used in the performance of the one or more tasks 102, identification of plate load orientation in the placement nests, and identification of grip specifications for transferring the labware or other items from, to, and between placement nests, stations and transport modes. Input data 110 may also include biological or other content data 116, which may include content or material specifications 117, or provide reference markers for the process 100 to obtain such information when the content data 116 has been received and the process 100 initiated. By way of example, such content data 116 include a sample identification, such as one comprising tissue, blood, urine or sample, or other type of biological material to be tested. Where the content 116 is related to a laboratory or life sciences workflow 104, it is to be understood that any type of biological content or material may be identified, and therefore the present invention is not to be limited to any specific type of content or material described herein.

The input data 110 may further include other items attendant to performing a workflow 104, such as for example timing data 118. Timing data 118 may be included to define when the one or more tasks are performed within the workflow 100, for example to ensure that content 116 is analyzed before it deteriorates to a point where an outcome of the workflow 104 is no longer valid. Timing data 118 may be entered by a user on an interface 190, or derived from one or more of the other types of input data 110, for example from the content or material specifications 117.

Other input data 110 may include third-party data such as LIMS (Laboratory Information Management System) data 119, and ELN (electronic laboratory notebook) data 120. The process 100 may be configured to import input data 110 from such third-party sources, as well as to export output data 170 to such third-party sources as noted further herein.

The input data 110 is applied to a plurality of data processing components 140 within a computing environment 130 that also includes one or more processors 132, a plurality of software and hardware components, and one or more modular software and hardware packages configured to perform specific processing functions. The one or more processors 132, plurality of software and hardware components, and one or more modular software and hardware packages are configured to execute program instructions to perform algorithms for various functions within the process 100 that are described in detail herein, and embodied in the one or more data processing modules 140.

The plurality of data processing components 140 include a data reception and initialization component 141 configured to receive, ingest, request, or otherwise obtain the input data 110 as noted above, and to initialize the process 100. The plurality of data processing components 140 also include an integration component 142, configured to compile device and operational information for performing the workcells 102 within the workflow 104, and generate get, handoff, and put sequences 143 that together define how a particular robot (or robots) 106 operates in the performance of a workflow 104. The integration component 142 includes an execution engine 144 which begins generating these sequences 143 by creating a transportation request 145, which specifies an origin, a destination, an item identifier 157 for each robot 106.

The plurality of data processing components 140 further include a path resolution component 146, within which origin and destination information from the integration component 142 are evaluated for each workstation or workcell 102 and robot 106. The path resolution component 146 receives the transportation request 145 from the integration component 142 and executes one or more path resolvers 158, which include queries of datasets for solving the transportation request 145, and analyzes the outcomes from the path resolvers 158 and the information obtained from dataset queries to determine an optimal path 147 and segments 148 thereof comprising the get, handoff and put sequences 143. Path resolvers 158 may include data relative to a single robot 106 or multiple robots 106, and may define handoff protocols between robots 106 as well as accounting for characteristics such as robot tracks, robot mobility, human involvement, etc., as discussed further below.

Paths 147 are resolved, prioritized, and evaluated in the present invention by the path resolution component 146, together with the integration component 142. It is to be understood that a path 147 both begins and ends at instruments comprising such equipment 112, and the path resolution component 146 executes the path resolvers 158 to accomplish path resolution, prioritization and evaluation using different steps to arrive at a set of get, handoff and put sequences 143 for carrying out a transportation request 145. This involves querying properties of each equipment 112 identified in a path 147 to determine which, if any, robots 106 will have access to nests, as well as if any stations are accessible to robots 106 directly or accessible via other robots. Stations refer to any non-instrument pickup/drop-off location, and are used by track or conveyor systems, autonomous vehicles, other robots, or people that are part of a path 147 for passing labware off between path segments 148.

Paths 147 are resolved by a collection of available path resolvers 158, which are algorithms configured to analyze the available paths 147 that can be taken to transfer an item from one instrument or piece of equipment 112 to the next in the get, handoff and put sequences 143. These path resolvers 158 include a single robot path resolver, in which the origin instrument and destination instrument are checked to determine if a single robot transfer can be used to access both pieces of equipment 112. If so, the path resolution component 146 returns a path 147 defined as a simple combination of sequences 143 for that robot 106. This provides the optimal transfer time in executing the transportation request 145, and the present invention therefore gives such a path 147 priority in the path resolution profile 150.

The path resolvers 158 also include a multi-robot path resolver, which determines if the path 147 can be created using multiple robot-to-robot handoff segments 148. To determine valid paths, the origin robots 106 are each evaluated based on the handoff stations that are accessible to other robots, recursively without backtracking, until all possible paths to the destination are found. All available paths are then considered and ordered in priority by applying a pathfinding algorithm such as A* or the like, and the path resolution component 146 returns a prioritized path 147 for the path resolution profile 150.

The path resolvers 158 also include an advanced transfer resolver, which evaluates the same robot transfer capabilities of the multi-robot path resolver, and further includes station-to-station transfers for track/conveyor transport (where labware can be transferred from station to station using linear track-based systems), autonomous vehicles that are used to transfer labware from station to station, and humans that can be instructed to transfer labware from station to station. In such an advanced transfer resolver, default prioritization is ordered as follows. A track/conveyor path 147 has priority over a multi-robot path 147 if it requires fewer robot transfers (where the number of robots 106 that need to be locked for this transportation to be successful is minimized, in order to maximize throughput on busy platforms). A robot and track/conveyor path 147 has priority over any other path 147 involving an autonomous vehicle or a human. Also, any path 147 not involving humans has priority over any path 147 involving humans. In this manner, the path resolution component 146 is able to prioritize paths 147 resolved by applying the path resolvers 158. It is to be understood that these prioritization rules may be amended, adjusted, added or overridden for special cases, or for unique configurations, for example using the support tool 191 and/or the user interface 190.

For each path 147, the present invention also performs several evaluations to determine additional aspects for completing the sequences 143 to carry out a transportation request 145 and build a path resolution profile 150. These include evaluating labware parameters for each robot transfer along a path 147. In evaluating labware parameters, for each labware or item type identified, and present invention determines a grip force. If a grip force is specified and the robot 106 is capable of an adjustable grip force, then each grip operation in the sequences 143 is parameterized with the specified grip force rather than the default robot grip force. A further parameter determined is a grip offset for each labware or item type. Any specified grip offset is added to associated points during the sequences 143 to ensure the labware can be properly gripped at the right location. For most labware this is simply a grip height difference, but full cartesian x, y, z, yaw, pitch, roll points may also be specified to carry out the specific grip necessary for the workcells 102.

If specific grip offsets are defined on a nest-by-nest basis, and the grip offsets differ between origin nest and destination nest, a re-grip sequence in the sequences 143 is calculated and used, rather than standard or pre-defined pick-and-place sequences. If a re-grip sequence is necessary, then the availability of a re-grip nest is determined, and if available, the following re-grip steps are queued up: pick from origin nest with source nest labware grip offset; place on re-grip nest with source nest labware grip offset; pick from re-grip nest with destination re-grip offset, and place on destination nest with destination re-grip offset. Otherwise, if there is no re-grip nest and there are no matching orientations, the path 147 is determined to be impossible and will not be available for execution in the path resolution profile 150.

The present invention also performs an evaluation of plate load orientation in nests. The origin nest orientation (for example, portrait, landscape, reverse portrait, reverse landscape) is identified and compared with destination orientation. If either origin or destination supports multiple orientations and there are matching orientations available, these matching orientations are used to prevent the need for a re-grip. If the origin and destination do not match and there is a re-grip nest is available, the following re-grip steps are queued up to change the plate orientation in the gripper, rather than the standard pick-and-place steps: pick from origin in origin orientation; place on re-grip in origin orientation; pick from re-grip nest destination orientation; and place from destination nest in destination orientation. Otherwise, if there is no re-grip nest and there are no matching orientations, the path 147 is determined to be impossible and will not be available for execution in the path resolution profile 150.

The path resolution component 146 may further include a path execution manager 149, which reserves or locks required devices (such as robots 106, vehicles, or other devices involved in the transport and conveyance of labware and other items between nests, stations and vehicles/devices) and defines one or more segments 148 of a path 147 for execution within the workflow 104 within a path resolution profile 150. The path resolution profile 150 defines how a workflow 104 is performed according to the optimal path 147 and segments 148 calculated in the path resolution component 146. The path resolution profile 150 is used to fulfill the associated transportation requests 145 by specifying the get, handoff, and put sequences 143 for each workcell 102 and between each robot 106 involved in a path 147.

The path resolution profile 150 may include instructions for execution 160 of a workflow 104 that performs the get, handoff, and put sequences 143 for workcells 102 in the one or more transportation requests 145 within the process 100, as well as generation of other output data 170. The path resolution profile 150 is sent to a scheduling component 151, which prepares a schedule 152 for the execution 160 of a workflow 104 in a workflow execution component 153.

Figure 2:
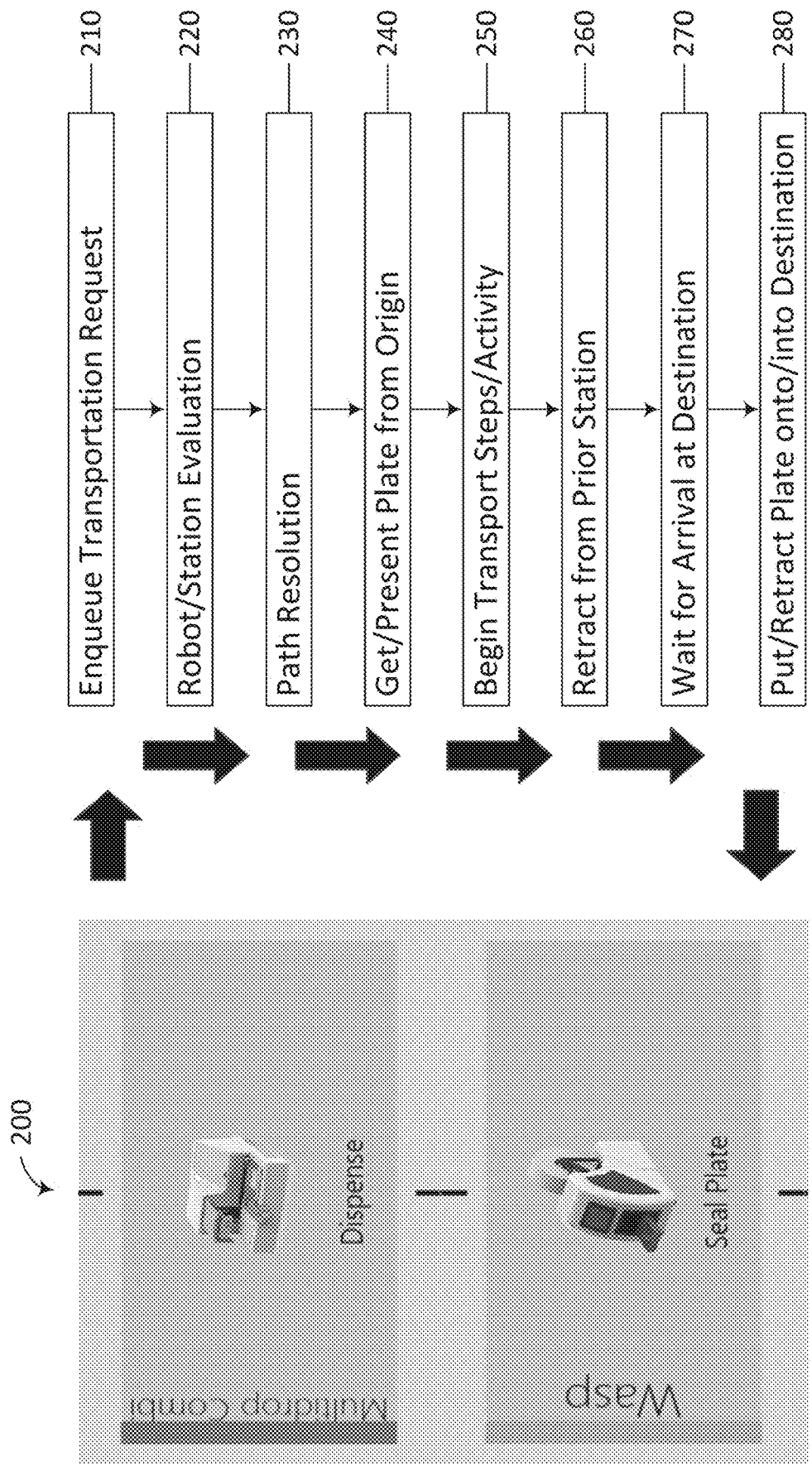
FIG. 2 is a flowchart of steps performed in the process for integrating multiple tasks or workcells performed by robotic equipment, and for scheduling and automated control of workflows, according to one aspect of the present invention.

The path resolution component 146 evaluates transportation requests 145 to enable the get, handoff, and put sequences for each workcell 102, and provides for simultaneous transport that minimizes delays in handoffs between workcells 102 and robots 106 to improve throughput. FIG. 2 shows stages of an exemplary get, handoff, and put sequence 200 defined by the path resolution component 146 in response to a transportation request 145. In FIG. 2, the transportation request 145 is queued at step 210, and a robot 106 or workstation 102 evaluation is initiated at step 220. The path resolution component 146 evaluates each workstation 102 and robot 106 and resolves a path 147 at step 230. A workflow execution component 153 then executes the workflow 104 according to the path resolution profile 150 by getting a plate or other item from its origin at step 240, and initiating the actions involved in transporting the item between workstations 102 at step 250. During the workflow 104, at each handoff between stations 102, the process 100 retracts the item from its prior workstation 102 at step 260 and waits for arrival of the item at its destination at step 270. The process 100 then puts the item in place at the next or destination workstation 102 at step 280.

The plurality of data processing components 140 may further be configured to provide information 171 to a user interface 190 relative to carrying out a workflow 104, or other output data 170. For example, the present invention may display information 171 such as instrument settings, a liquid handling status, error data, simulation outcomes, log files, LIMS and ELN data, a workflow performance status, plate location, assay details, etc. on the user interface 190. Such information 171 may also exported to third-parties or other users.

The plurality of data processing components 140 may also include a simulation component 155, configured to simulate integration of workcells and the use of robots 106 to improve determination of get, handling and put sequences 143 and resolving paths 147 for different types of workflows 104 and involving different workcells 102 and robots 106.

The plurality of data processing components 140 may also include an artificial intelligence engine 156 configured to apply one or more machine learning techniques within the process 100 to improve an understanding of get, handling and put sequences and predict paths 147. Predictions developed by the artificial intelligence engine 156 may be applied to the simulation component 155 to improve simulation outcomes and the determination of get, handling and put sequences and resolution of paths 147. The present invention contemplates that many different types of artificial intelligence may be employed within the scope thereof, and therefore, the artificial intelligence engine 156 may include one or more of such types of artificial intelligence. The artificial intelligence engine 156 may apply techniques that include, but are not limited to, k-nearest neighbor (KNN), logistic regression, support vector machines or networks (SVM), and one or more neural networks. Regardless, the use of artificial intelligence in the process 100 of the present invention enhances the utility of output data 170 by automatically and heuristically constructing appropriate relationships, mathematical or otherwise, relative to the interactions required between workcells 102 and robots 106, and the resolution of optimal paths 147 between them for performance of workflows 104.

The data processing components 140 are configured to generate output data 170 that may take many different forms. Output data 170 may include, in addition to the execute instruction 160 and visualized information 171 as noted above, a label 172, a compliance report 173, an audit report 174, an output to a LIMS 175, an output to an ELN 176, and deadlock detection 177. The output data 170 may also include video 178 of a workflow 104 being performed, either as a live stream or fixed in time. The output data 170 may also include an alarm 179 such as a verbal, visual, aural, or other indication, for example to indicate that an incident or problem has been detected in the performance of a workflow 104, or that a workflow 104 has been successfully completed.

The present invention, as noted above, includes a user interface 190. The interface 190 enables users to track a workflow 104, as well as samples and labware as a workflow is executed. The interface 190 may also be used to visualize information 171 and control performance of the workflow 104, as well as to make modifications and adjustments to workflows 104 while they are being conducted. The interface 190 may include one or more support tools 191 for accessing or controlling specific functions within a process 100. Regardless, the interface 190 may include widgets, drop-down or pull-down menus, and other indicia presented via a graphical display that enable a user to make selections and perform functions attendant to performance of workflows 104. Users may access the interface from desktop, laptop, and mainframe computing systems, as well as by using mobile telephony, tablet, wearable computing devices, augmented reality, or virtual reality device, whether via dedicated applications on such devices or via the Internet directly.

As noted above, the process 100 develops a profile 150 that is used to defines how a workflow 104 is performed, according to the path 147 representing an integrated set of get, handoff, and put sequences 143 for each workcell 102 and between each robot 106. The path resolution profile 150 therefore acts as a map and includes instructions for execution 160 of a workflow 104. The profile 150 is also used in the process 100 to schedule workflows 104, and is therefore used by the scheduling component 151 and the workflow execution component 153 as processes 100 are carried out within the present invention.

Figure 3:
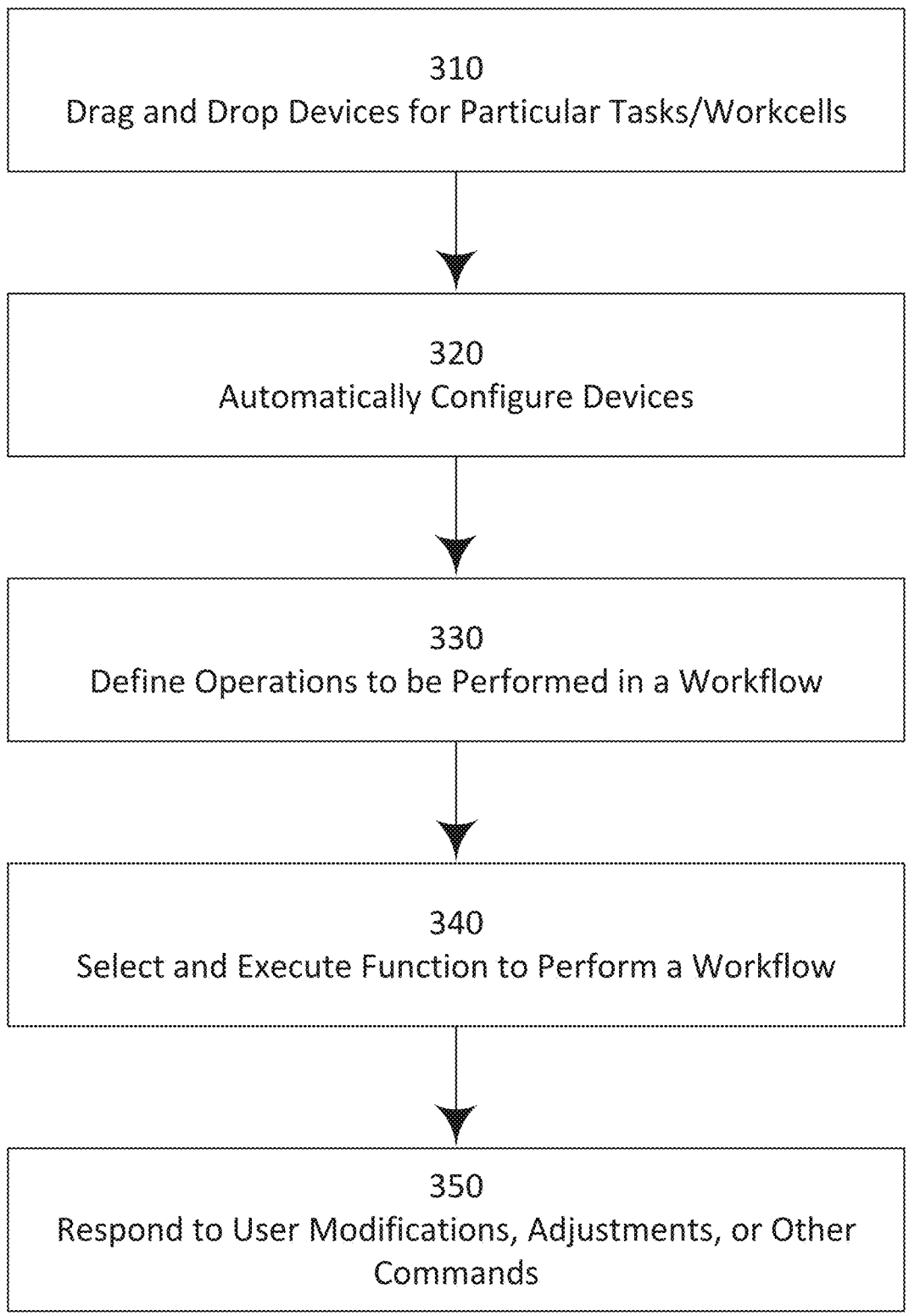
FIG. 3 is a flowchart of steps performed in the process for integrating multiple tasks or workcells performed by robotic equipment, and for scheduling and automated control of workflows, according to another aspect of the present invention.

FIG. 3 is a flowchart illustrating steps 300 in a process 100 for performing automated workflows 104 according to another aspect of the present invention. A user selects equipment for a workflow 104 by dragging and dropping devices or robots 106 for particular tasks, experiments, workstations, or other workcells 102 via the interface 190 at step 310. The process 100 then configures these robots 106 automatically at step 320, through their associated device drivers 113, device specifications 114, and any other information needed to initiate the process 100. Alternatively, the process 100 may automatically recognize existing equipment to be used where a user simply selects the name of laboratory where a workflow 104 will be conducted, and uploads robot information according to such a selection.

FIG. 3 continues at step 330, where a user defines the operations to be performed in a workflow 104 and using the selected devices or robots 106. This may be accomplished by dragging and dropping pre-identified operations, or by typing textual indications of operations via the user interface 190. Regardless, the user is able to define and customize what operations constitute a workflow 104. At step 340, the user selects an execute function to perform the workflow 104, and at step 350 the process 100 is able to respond to user modifications, adjustments, or other commands, and the user is able to monitor progress of the workflow 104 via the interface 190.

Figure 4:
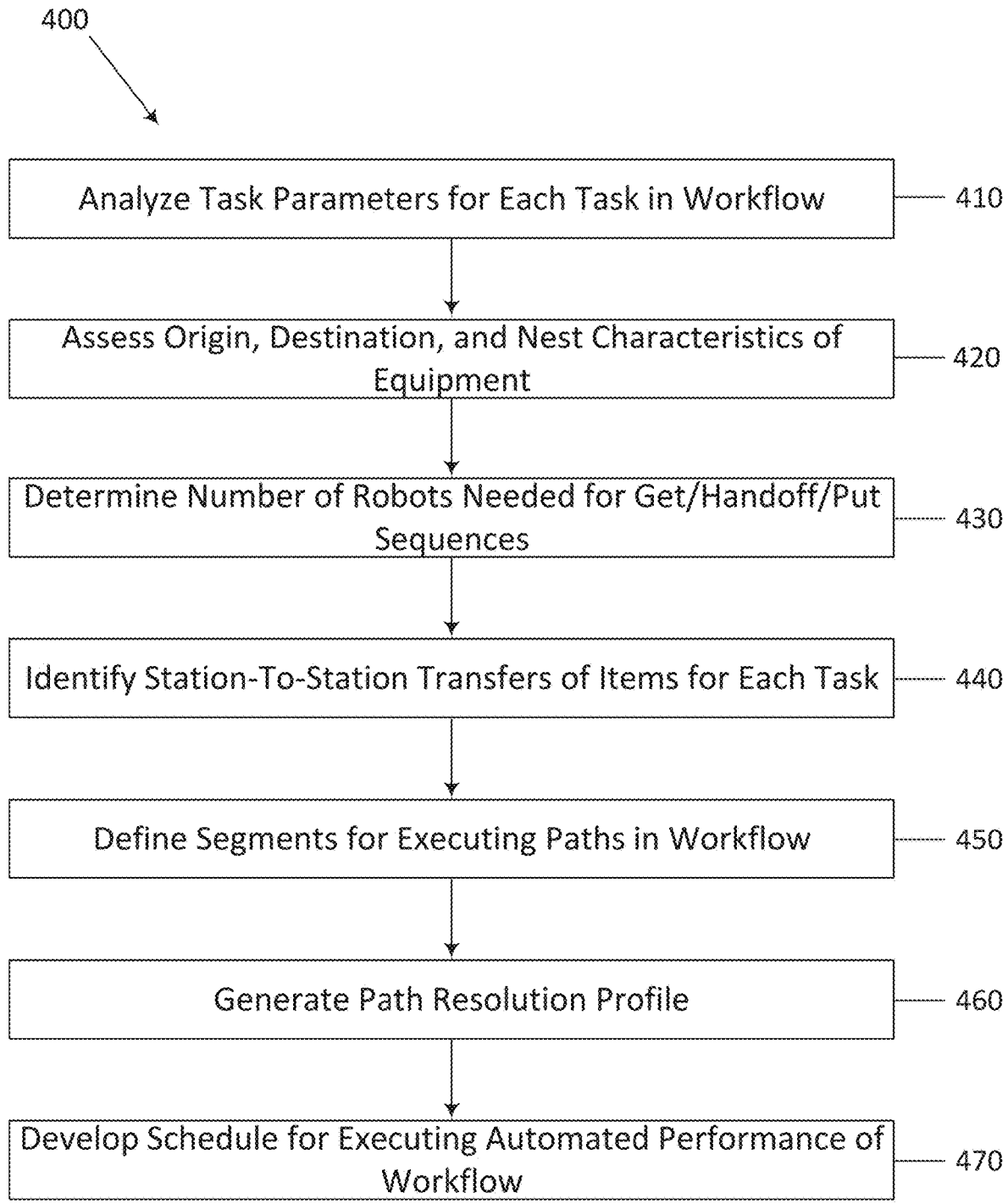
FIG. 4 is a flowchart of steps performed in a process for resolving paths and prioritizing transfers in performing a workflow according to one aspect of the present invention.

FIG. 4 is a flowchart illustrating steps in a process 400 of resolving paths for performing the get, handoff, and put sequences for each task in the one or more tasks, for prioritizing transfers of items in the performance of the workflow, according to another aspect of the present invention. This process 400 begins with step 410 in which the present invention analyzes a plurality of task parameters for each task. Task parameters include, as noted above, characteristics of performing a task such as grip force, grip offset, and plate load orientation in nests, and may further include robot specifications and station characteristics.

At step 420, the process 400 according to this aspect of the present invention assesses origin, destination, and nest characteristics of the equipment 112, and at step 430 determines the number of robots needed to carry out the get, handoff, and put sequences 143, which may include querying properties of each equipment 112 to determine which, if any, robots 106 will have access to nests, as well as if any stations are accessible to robots 106 directly or via other robots. At step 440, the process 400 identifies station-to-station transfers of items for each task in the one or more tasks.

Once characteristics, robots, and transfer identification are assessed, the present invention is ready to proceed with finalizing the optimal path 147. At step 450, the process 400 defines segments 148 for executing the paths 147 in the workflow 104, and generates a path resolution profile 150 with these segments 148. The present invention then develops a schedule 152 for executing an automated performance of the workflow 104 from the path resolution profile 150 at step 460. The workflow 104 may then be controlled and performed based on the schedule 152.

The user interface 190 may be configured to permit users to access multiple, additional functions in an advanced mode. Such functions may include offline instrument access, recovery features, and scripting capabilities. Additionally, users may configure the present invention to seamlessly integrate with any external LIMS/informatics or ELN platform for importing or exporting data, perform real-time positive sample tracking, track other users, instruments, and other process data, and enable advanced features such as integration of artificial intelligence and machine learning functions as noted above.

It is to be understood that the present invention is not to be limited to any particular type of workflow 104 performed, and that the process 100 of the present invention may be applied to any field where automated control of robots 106 and/or tasks 102 is desired. Accordingly, the content 116 in the input data 100 may include any subject matter for which an automated process 100 is applied. For example, the content 116 may be packaging, and the automated process 100 may be a workflow for identifying an item to be shipped, preparing the item in a package, and scheduling a shipment of the package. Many types of workflows 104 are therefore possible and are within the scope of the present invention.

The systems and methods of the present invention may be implemented in many different computing environments 130. For example, they may be implemented in conjunction with a special purpose computer, a programmed microprocessor or microcontroller and peripheral integrated circuit element(s), an ASIC or other integrated circuit, a digital signal processor, electronic or logic circuitry such as discrete element circuit, a programmable logic device or gate array such as a PLD, PLA, FPGA, PAL, GPU and any comparable means. In general, any means of implementing the methodology illustrated herein can be used to implement the various aspects of the present invention. Exemplary hardware that can be used for the present invention includes computers, handheld devices, telephones (e.g., cellular, Internet enabled, digital, analog, hybrids, and others), and other such hardware. Some of these devices include processors (e.g., a single or multiple microprocessors or general processing units), memory, nonvolatile storage, input devices, and output devices. Furthermore, alternative software implementations including, but not limited to, distributed processing, parallel processing, virtual machine processing, or cloud processing can also be configured to perform the methods described herein.

The systems and methods of the present invention may also be wholly or partially implemented in software that can be stored on a non-transitory computer-readable storage medium, executed on programmed general-purpose computer with the cooperation of a controller and memory, a special purpose computer, a microprocessor, or the like. In these instances, the systems and methods of this invention can be implemented as a program embedded on a mobile device or personal computer through such mediums as an applet, JAVA® or CGI script, as a resource residing on one or more servers or computer workstations, as a routine embedded in a dedicated measurement system, system component, or the like. The system can also be implemented by physically incorporating the system and/or method into a software and/or hardware system.

Additionally, the data processing functions disclosed herein may be performed by one or more program instructions stored in or executed by such memory, and further may be performed by one or more modules configured to carry out those program instructions. Modules are intended to refer to any known or later developed hardware, software, firmware, machine learning, artificial intelligence, fuzzy logic, expert system or combination of hardware and software that is capable of performing the data processing functionality described herein.

In closing, it is to be understood that although aspects of the present specification are highlighted by referring to specific embodiments, one skilled in the art will readily appreciate that these disclosed embodiments are only illustrative of the principles of the subject matter disclosed herein. It is not intended to be exhaustive or to limit the invention to the precise forms disclosed. Therefore, it should be understood that the disclosed subject matter is in no way limited to a particular compound, composition, article, apparatus, methodology, protocol, and/or reagent, etc., described herein, unless expressly stated as such. In addition, those of ordinary skill in the art will recognize that certain changes, modifications, permutations, alterations, additions, subtractions and sub-combinations thereof can be made in accordance with the teachings herein without departing from the spirit of the present specification. It is therefore intended that the scope of the invention is not to be limited by this detailed description. Furthermore, it is intended that the following appended claims and claims hereafter introduced are interpreted to include all such changes, modifications, permutations, alterations, additions, subtractions and sub-combinations as are within their true spirit and scope.

Certain embodiments of the present invention are described herein, including the best mode known to the inventors for carrying out the invention. Of course, variations on these described embodiments will become apparent to those of ordinary skill in the art upon reading the foregoing description. The inventor expects skilled artisans to employ such variations as appropriate, and the inventors intend for the present invention to be practiced otherwise than specifically described herein. Accordingly, this invention includes all modifications and equivalents of the subject matter recited in the claims appended hereto as permitted by applicable law. Moreover, any combination of the above-described embodiments in all possible variations thereof is encompassed by the invention unless otherwise indicated herein or otherwise clearly contradicted by context.

Groupings of alternative embodiments, elements, or steps of the present invention are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

Unless otherwise indicated, all numbers expressing a characteristic, item, quantity, parameter, property, term, and so forth used in the present specification and claims are to be understood as being modified in all instances by the term "about." As used herein, the term "about" means that the characteristic, item, quantity, parameter, property, or term so qualified encompasses a range of plus or minus ten percent above and below the value of the stated characteristic, item, quantity, parameter, property, or term. Accordingly, unless indicated to the contrary, the numerical parameters set forth in the specification and attached claims are approximations that may vary. For instance, as mass spectrometry instruments can vary slightly in determining the mass of a given analyte, the term "about" in the context of the mass of an ion or the mass/charge ratio of an ion refers to +/−0.50 atomic mass unit. At the very least, and not as an attempt to limit the application of the doctrine of equivalents to the scope of the claims, each numerical indication should at least be construed in light of the number of reported significant digits and by applying ordinary rounding techniques.

Notwithstanding that the numerical ranges and values setting forth the broad scope of the invention are approximations, the numerical ranges and values set forth in the specific examples are reported as precisely as possible. Any numerical range or value, however, inherently contains certain errors necessarily resulting from the standard deviation found in their respective testing measurements. Recitation of numerical ranges of values herein is merely intended to serve as a shorthand method of referring individually to each separate numerical value falling within the range. Unless otherwise indicated herein, each individual value of a numerical range is incorporated into the present specification as if it were individually recited herein.

Use of the terms "may" or "can" in reference to an embodiment or aspect of an embodiment also carries with it the alternative meaning of "may not" or "cannot." As such, if the present specification discloses that an embodiment or an aspect of an embodiment may be or can be included as part of the inventive subject matter, then the negative limitation or exclusionary proviso is also explicitly meant, meaning that an embodiment or an aspect of an embodiment may not be or cannot be included as part of the inventive subject matter. In a similar manner, use of the term "optionally" in reference to an embodiment or aspect of an embodiment means that such embodiment or aspect of the embodiment may be included as part of the inventive subject matter or may not be included as part of the inventive subject matter. Whether such a negative limitation or exclusionary proviso applies will be based on whether the negative limitation or exclusionary proviso is recited in the claimed subject matter.

The terms "a," "an," "the" and similar references used in the context of describing the present invention (especially in the context of the following claims) are to be construed to cover both the singular and the plural, unless otherwise indicated herein or clearly contradicted by context. Further, ordinal indicators—such as "first," "second," "third," etc.—for identified elements are used to distinguish between the elements, and do not indicate or imply a required or limited number of such elements, and do not indicate a particular position or order of such elements unless otherwise specifically stated. All methods described herein can be performed in any suitable order unless otherwise indicated herein or otherwise clearly contradicted by context. The use of any and all examples, or exemplary language (e.g., "such as") provided herein is intended merely to better illuminate the present invention and does not pose a limitation on the scope of the invention otherwise claimed. No language in the present specification should be construed as indicating any non-claimed element essential to the practice of the invention.

When used in the claims, whether as filed or added per amendment, the open-ended transitional term "comprising", variations thereof such as "comprise" and "comprises", and equivalent open-ended transitional phrases thereof like "including," "containing" and "having", encompasses all the expressly recited elements, limitations, steps, integers, and/or features alone or in combination with unrecited subject matter; the named elements, limitations, steps, integers, and/or features are essential, but other unnamed elements, limitations, steps, integers, and/or features may be added and still form a construct within the scope of the claim. Specific embodiments disclosed herein may be further limited in the claims using the closed-ended transitional phrases "consisting of" or "consisting essentially of" (or variations thereof such as "consist of", "consists of", "consist essentially of", and "consists essentially of") in lieu of or as an amendment for "comprising." When used in the claims, whether as filed or added per amendment, the closed-ended transitional phrase "consisting of" excludes any element, limitation, step, integer, or feature not expressly recited in the claims. The closed-ended transitional phrase "consisting essentially of" limits the scope of a claim to the expressly recited elements, limitations, steps, integers, and/or features and any other elements, limitations, steps, integers, and/or features that do not materially affect the basic and novel characteristic(s) of the claimed subject matter. Thus, the meaning of the open-ended transitional phrase "comprising" is being defined as encompassing all the specifically recited elements, limitations, steps and/or features as well as any optional, additional unspecified ones. The meaning of the closed-ended transitional phrase "consisting of" is being defined as only including those elements, limitations, steps, integers, and/or features specifically recited in the claim whereas the meaning of the closed-ended transitional phrase "consisting essentially of" is being defined as only including those elements, limitations, steps, integers, and/or features specifically recited in the claim and those elements, limitations, steps, integers, and/or features that do not materially affect the basic and novel characteristic(s) of the claimed subject matter. Therefore, the open-ended transitional phrase "comprising" (and equivalent open-ended transitional phrases thereof) includes within its meaning, as a limiting case, claimed subject matter specified by the closed-ended transitional phrases "consisting of" or "consisting essentially of." As such embodiments described herein or so claimed with the phrase "comprising" are expressly or inherently unambiguously described, enabled and supported herein for the phrases "consisting essentially of" and "consisting of."

All patents, patent publications, and other references cited and identified in the present specification are individually and expressly incorporated herein by reference in their entirety for the purpose of describing and disclosing, for example, the compositions and methodologies described in such publications that might be used in connection with the present invention. These publications are provided solely for their disclosure prior to the filing date of the present application. Nothing in this regard is or should be construed as an admission that the inventors are not entitled to antedate such disclosure by virtue of prior invention or for any other reason. All statements as to the date or representation as to the contents of these documents is based on the information available to the applicant and does not constitute any admission as to the correctness of the dates or contents of these documents.

Lastly, the terminology used herein is for the purpose of describing particular embodiments only and is not intended to limit the scope of the present invention, which is defined solely by the claims. Accordingly, the present invention is not limited to that precisely as shown and described.

The invention claimed is:

1. A method, comprising:
   receiving, as input data, operational data defining one or more tasks in a performance of a workflow, and equipment data defining at least one piece of automated equipment for the one or more tasks in the performance of the workflow;
   analyzing the input data in a plurality of data processing modules within a computing environment in which the plurality of data processing modules are executed in conjunction with at least one specifically-configured processor, the plurality of data processing modules configured to integrate the one or more tasks in the performance of the workflow and schedule the performance of the workflow, by
   1) configuring the at least one piece of automated equipment and the one or more tasks in the performance of the workflow,
   2) defining at least one get, handoff, and put sequence for each piece of automated equipment for a task in the one or more tasks,
   3) calculating a path for performing the at least one get, handoff, and put sequence, by executing one or more path resolvers to analyze a plurality of task parameters for each task in the one or more tasks and identify one or more segments for transferring one or more items in each task for executing the path, by assessing origin, destination, and nest characteristics of the at least one piece of automated equipment, determining a number of robots for the at least one get, handoff and put sequence, and prioritizing station-to-station transfers of the one or more items for each tasks in the one or more tasks, wherein the one or more path resolvers analyze the segments for transferring the items based on the number of handoff segments in at least one of a single robot path resolver, a multi-robot path resolver, and an advanced transfer resolver, and wherein the plurality of task parameters include a grip force and a grip offset of a grip operation, so that each grip operation in the at least one get, handoff, and put sequence is parameterized with the grip force and the grip offset at specific cartesian x, y, z, points representing yaw, pitch and roll of the at least one piece of automated equipment during the at least one get, handoff, and put sequence to execute a specific grip for each of the one or more items, and
   4) generating a path resolution profile defining the workflow for each path;
   developing a schedule for executing the performance of the workflow from the path resolution profile, wherein the workflow is automated and performed based on the schedule; and
   activating and operating the at least one piece of automated equipment, and executing the one or more tasks using the at least one piece of automated equipment, in the performance of the workflow.

2. The method of claim 1, further comprising applying the path resolution profile to a support tool configured to provide output data to a user relative to the performance of the workflow.

3. The method of claim 1, further comprising initiating the schedule to execute the performance of the workflow.

4. The method of claim 1, further comprising displaying the schedule on a user interface.

5. The method of claim 3, wherein the equipment data and the operational data are selected by a user with the user interface.

6. The method of claim 1, wherein the at least one piece of automated equipment includes a robot.

7. The method of claim 1, wherein the equipment data includes device drivers and device specifications.

8. The method of claim 1, wherein the operational data includes an identification of the one or more tasks in performing the workflow, and defines a content of the one or more tasks.

9. The method of claim 8, wherein the operational data further includes identification of placement nests, stations, and transport modes used in performing the one or more tasks, and identification of specific items used in the performance of the one or more tasks.

10. The method of claim 8, wherein the content is a biological material.

11. The method of claim 1, wherein the input data further comprises timing data that defines when the one or more tasks are performed within the workflow.

12. The method of claim 2, further comprising adjusting one or more prioritization rules to calculate the path for performing the at least one get, handoff, and put sequence, wherein the user performs the adjusting the one or more prioritization rules with the support tool.

13. A method, comprising:
   within a computing environment comprised of a computer processor and at least one computer-readable storage medium operably coupled to the computer processor and having program instructions stored therein, the computer processor being operable to execute the program instructions to integrate one or more tasks using at least one piece of automated equipment in a performance of a workflow, and schedule the performance of the workflow by:

resolving one or more paths for performing get, handoff, and put sequences for each task in the one or more tasks, by prioritizing transfers of items in the performance of the workflow, the prioritizing the transfers of the items determined by analyzing a plurality of task parameters for each task in the one or more tasks, assessing origin, destination, and nest characteristics of the at least one piece of automated equipment, determining a number of robots for the get, handoff, and put sequences, and identifying station-to-station transfers of items for each tasks in the one or more tasks, wherein one or more path resolvers analyze segments for the transfers of the items based on a number of handoff segments in at least one of a single robot path resolver, a multi-robot path resolver, and an advanced transfer resolver, and wherein the plurality of task parameters include a grip force and a grip offset of a grip operation, so that each grip operation in the get, handoff, and put sequences is parameterized with the grip force and the grip offset at specific cartesian x, y, z, points representing yaw, pitch and roll of the at least one piece of automated equipment to execute a specific grip for each item;

generating a path resolution profile defining the segments for executing the one or more paths in the workflow, and developing a schedule for executing the performance of the workflow from the path resolution profile, wherein the workflow is automated and performed based on the schedule; and actuating and controlling the at least one piece of automated equipment, and executing the one or more tasks using the at least one piece of automated equipment, in the performance of the workflow.

14. The method of claim 13, further comprising applying the path resolution profile to a support tool configured to provide output data to a user relative to the performance of the workflow.

15. The method of claim 13, further comprising initiating the schedule to execute the performance of the workflow.

16. The method of claim 13, further comprising displaying the schedule on a user interface.

17. The method of claim 16, wherein the equipment data and the operational data are selected by a user with the user interface.

18. The method of claim 13, wherein the at least one piece of automated equipment includes a robot.

19. The method of claim 13, wherein the one or more tasks in the performance of the workflow are defined by operational data that identifies the one or more tasks in performing the workflow, specifies a content of the one or more tasks, identifies placement nests, stations, and transport modes used in performing the one or more tasks, and identifies specific items used in the performance of the one or more tasks.

20. The method of claim 19, wherein the content is a biological material.

21. The method of claim 14, further comprising adjusting one or more prioritization rules for resolving the one or more paths, wherein the user performs the adjusting the one or more prioritization rules with the support tool.

22. A system comprising:
a computing environment including at least one computer-readable storage medium having program instructions stored therein and a computer processor operable to execute the program instructions to integrate one or more tasks using at least one piece of automated equipment in a performance of a workflow, and schedule the performance of the workflow within a plurality of data processing modules, the plurality of data processing modules including:
a data reception and initialization component configured to obtain operational data defining one or more tasks in the performance of the workflow, and equipment data defining the at least one piece of automated equipment for the one or more tasks in the performance of the workflow;
one or more components arranged to
1) configure the at least one piece of automated equipment and the one or more tasks in the performance of the workflow,
2) define at least one get, handoff, and put sequence for each piece of automated equipment for a task in the one or more tasks,
3) calculate a path for performing the at least one get, handoff, and put sequence, by executing one or more path resolvers to analyze a plurality of task parameters for each task in the one or more tasks and identify one or more segments for transferring one or more items in each task for executing the path, by assessing origin, destination, and nest characteristics of the at least one piece of automated equipment, determining a number of robots for the at least one get, handoff, and put sequence, and prioritizing station-to-station transfers of the one or more items for each tasks in the one or more tasks, wherein the one or more path resolvers analyze the segments for transferring the items based on the number of handoff segments in at least one of a single robot path resolver, a multi-robot path resolver, and an advanced transfer resolver, and wherein the plurality of task parameters include a grip force and a grip offset of a grip operation, so that each grip operation in the at least one get, handoff, and put sequence is parameterized with the grip force and the grip offset at specific cartesian x, y, z, points representing yaw, pitch and roll of the at least one piece of automated equipment during the at least one get, handoff, and put sequence to execute a specific grip for each of the one or more items, and
4) generate a path resolution profile defining the workflow for each path; and
a scheduling module configured to develop a schedule for executing the performance of the workflow from the path resolution profile, wherein the workflow is automated and performed based on the schedule,
wherein the at least one piece of automated equipment is actuated and controlled, and the one or more tasks are executed using the at least one piece of automated equipment, in the performance of the workflow.

23. The system of claim 22, wherein the path resolution profile is applied to a support tool configured to provide output data to a user relative to the performance of the workflow.

24. The system of claim 22, further comprising a workflow execution component configured to initiate the schedule to execute the performance of the workflow.

25. The system of claim 22, wherein the schedule is displayed on a user interface.

26. The system of claim 25, wherein the equipment data and the operational data are selected by a user with the user interface.

27. The system of claim 22, wherein the at least one piece of automated equipment includes a robot.

28. The system of claim 22, wherein the equipment data includes device drivers and device specifications.

29. The system of claim 22, wherein the operational data includes an identification of the one or more tasks in performing the workflow, and defines a content of the one or more tasks.

30. The system of claim 29, wherein the operational data further includes identification of placement nests, stations, and transport modes used in performing the one or more tasks, and identification of specific items used in the performance of the one or more tasks.

31. The system of claim 29, wherein the content is a biological material.

32. The system of claim 22, wherein the input data further comprises timing data that defines when the one or more tasks are performed within the workflow.

33. The system of claim 22, wherein the one or more components are further arranged to enable the user to adjust one or more prioritization rules to calculate the path for performing the at least one get, handoff, and put sequence, wherein the user adjusts the one or more prioritization rules with the support tool.

* * * * *